United States Patent
Yamada et al.

(10) Patent No.: US 9,683,131 B2
(45) Date of Patent: Jun. 20, 2017

(54) LOW-TEMPERATURE, FAST CURING COATING COMPOSITION AND CURED ARTICLE

(71) Applicant: Shin-Etsu Chemical Co., Ltd., Tokyo (JP)

(72) Inventors: Tetsuro Yamada, Annaka (JP); Yuji Yoshikawa, Annaka (JP); Kazuhiro Tsuchida, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 14/248,495

(22) Filed: Apr. 9, 2014

(65) Prior Publication Data

US 2014/0323653 A1   Oct. 30, 2014

(30) Foreign Application Priority Data

Apr. 26, 2013 (JP) ................. 2013-093760

(51) Int. Cl.
| | |
|---|---|
| *C08G 77/12* | (2006.01) |
| *C09D 183/04* | (2006.01) |
| *C09D 183/14* | (2006.01) |
| *C08G 77/48* | (2006.01) |
| *C08G 77/50* | (2006.01) |
| *C08K 5/5425* | (2006.01) |
| *C08K 5/57* | (2006.01) |

(52) U.S. Cl.
CPC ......... *C09D 183/04* (2013.01); *C08G 77/485* (2013.01); *C08G 77/50* (2013.01); *C09D 183/14* (2013.01); *C08G 77/12* (2013.01); *C08K 5/5425* (2013.01); *C08K 5/57* (2013.01)

(58) Field of Classification Search
CPC ................. C08G 77/12; C07F 7/182
USPC ..................................... 528/31, 32
See application file for complete search history.

(56) References Cited

U.S. PATENT DOCUMENTS

| | | | |
|---|---|---|---|
| 3,175,993 A * | 3/1965 | Weyenberg | .............. 528/27 |
| 5,464,901 A | 11/1995 | Yoshikawa et al. | |
| 7,338,689 B2 * | 3/2008 | Shin et al. | ............... 427/387 |
| 7,576,230 B2 | 8/2009 | Shin et al. | |
| 2010/0076211 A1 | 3/2010 | Yamane et al. | |

FOREIGN PATENT DOCUMENTS

| | | |
|---|---|---|
| EP | 0616011 B1 | 11/1997 |
| EP | 1493746 B1 | 12/2007 |
| JP | 6-271650 A | 9/1994 |
| JP | 2801660 B2 | 9/1998 |
| JP | 11-166052 A | 6/1999 |
| JP | 2005-23075 A | 1/2005 |
| JP | 2009-263576 A | 11/2009 |

OTHER PUBLICATIONS

Wikepedia—tetrabutyltitanate (https://en.wikipedia.org/wiki/Titanium_butoxide)(date unknown).*
Extended European Search Report issued Jun. 30, 2014, in European Patent Application No. 14163916.1.

* cited by examiner

*Primary Examiner* — Kuo-Liang Peng
(74) *Attorney, Agent, or Firm* — Birch, Stewart, Kolasch & Birch, LLP

(57) ABSTRACT

A coating composition comprising (A) an organosiloxane obtained from hydrosilylation reaction of an organohydrogensiloxane having at least two hydrosilyl groups with an alkenyl-containing alkoxysilane, and (B) an organometallic catalyst is fast curable at low temperature. The cured coating is crack resistant.

17 Claims, No Drawings

LOW-TEMPERATURE, FAST CURING COATING COMPOSITION AND CURED ARTICLE

CROSS-REFERENCE TO RELATED APPLICATION

This non-provisional application claims priority under 35 U.S.C. §119(a) on Patent Application No. 2013-093760 filed in Japan on Apr. 26, 2013, the entire contents of which are hereby incorporated by reference.

TECHNICAL FIELD

This invention relates to a low-temperature, fast curing coating composition comprising an organosiloxane and an organometallic catalyst, and a cured article thereof.

BACKGROUND ART

Alkoxysilyl-containing silane and siloxane compounds are widely used in paint and coating applications. When these alkoxysilyl-containing siloxane compounds are blended with curing catalysts, alkoxy groups react at normal temperature to form a siloxane network. Coatings having heat resistance and weather resistance can be readily formed. They are thus used in a wide variety of applications covering from outdoor buildings to electronic parts.

Such alkoxysilyl-containing siloxane compounds are generally prepared by partial hydrolysis of alkoxysilanes as described in Patent Documents 1 to 3. However, the alkoxy-containing siloxane compounds have the drawback of a low cure rate. It is believed that highly active alkoxy groups are consumed during hydrolysis reaction while less active alkoxy groups are left behind. Thus the subsequent cure reaction proceeds at a low rate.

Patent Document 4 discloses another method for preparing an alkoxysilyl-containing siloxane compound by hydrosilylation reaction of a silicone compound containing a hydrosilyl group with a compound containing both an olefin and an alkoxysilyl group. Even when siloxane compounds are produced by this method, no significant improvements in reaction rate are observed.

Patent Document 5 proposes to use an alkoxysilyl-containing cyclic siloxane compound as an insulating film-forming material. Although the cyclic siloxane compound contains many active alkoxysilyl groups, no significant improvements in reaction rate are observed over ordinary alkoxysilanes.

A coating composition comprising a low-molecular-weight alkoxysilyl-containing silane or siloxane compound such as tetramethoxysilane is highly reactive and cures within 15 minutes in an environment of 25° C. and 50% RH, for example. However, its coating is brittle and has mechanical properties insufficient to withstand use as coating film, as demonstrated by cracking in the course of curing.

CITATION LIST

Patent Document 1: JP 2801660
Patent Document 2: JP-A H11-166052
Patent Document 3: JP-A 2009-263576
Patent Document 4: JP-A H06-271650 (U.S. Pat. No. 5,464,901, EP 0616011 B1)
Patent Document 5: JP-A 2005-023075 (U.S. Pat. No. 7,576,230, EP 1493746 B1)

DISCLOSURE OF INVENTION

An object of the invention is to provide a low-temperature, fast curing coating composition which is fully reactive and cures into a film having improved crack resistance, and a cured article thereof.

The inventors have found that a coating composition comprising (A) an organosiloxane obtained by reacting (i) a siloxane compound (or organohydrogensiloxane) containing at least two hydrosilyl (Si—H) groups per molecule with (ii) a silane compound containing an olefin moiety of a specific carbon chain and an alkoxysilyl group, the resulting organosiloxane having a plurality of alkoxysilyl groups per molecule, each alkoxysilyl group being bonded to a silicon atom in the organosiloxane via the specific carbon chain (i.e., alkylene chain of at least 6 carbon atoms), and (B) an organometallic catalyst is fast curable at low temperature and that a cured film thereof has crack resistance and alkali resistance.

In one aspect, the invention provides a low-temperature, fast curing coating composition comprising (A) an organosiloxane obtained from hydrosilylation reaction of an organohydrogensiloxane having at least two hydrosilyl groups per molecule with an alkenyl-containing alkoxysilane having the general formula (1):

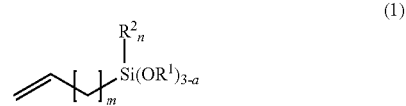

wherein m is an integer of 4 to 12, n is 0, 1 or 2, $R^1$ and $R^2$ are each independently $C_1$-$C_3$ alkyl or $C_6$-$C_{10}$ aryl, and (B) an organometallic catalyst.

In a preferred embodiment, the organohydrogensiloxane is a cyclic siloxane.

In a preferred embodiment, the organosiloxane (A) has the general formula (2):

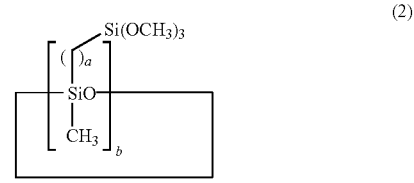

wherein a is an integer of 6 to 14 and b is an integer of 3 to 6.

More preferably, the organosiloxane (A) has the general formula (3):

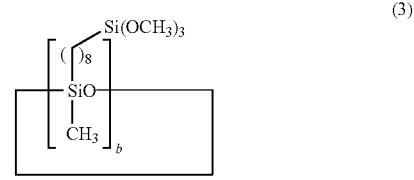

wherein b is an integer of 3 to 6.

In a preferred embodiment, the organometallic catalyst (B) comprises titanium.

In a preferred embodiment, the coating composition is substantially solvent-free.

In a preferred embodiment, the organosiloxane (A) is mixed with the organometallic catalyst (B) immediately before use.

Also contemplated herein is a cured article of the coating composition defined above.

ADVANTAGEOUS EFFECTS OF INVENTION

The coating composition of the invention is based on (A) an organosiloxane obtained from reaction of (i) an organohydrogensiloxane with (ii) a silane compound containing an olefin moiety of a specific carbon chain and an alkoxysilyl group. Since the organosiloxane has a plurality of alkoxysilyl groups per molecule, each alkoxysilyl group being bonded to a silicon atom in the organosiloxane via the specific carbon chain (i.e., alkylene chain of at least 6 carbon atoms), the coating composition exhibits a fast curing ability at low temperature when it is applied and cured to a substrate. The cured film has crack resistance and alkali resistance. The coating composition exhibits an outstanding low-temperature, fast curing ability particularly when the organosiloxane (A) has a cyclic siloxane structure.

DESCRIPTION OF PREFERRED EMBODIMENTS

As used herein, the notation "$C_x$-$C_y$" means a group containing from "x" to "y" carbon atoms per group.

The low-temperature, fast curing coating composition of the invention is defined as comprising (A) an organosiloxane obtained from hydrosilylation reaction of (i) an organohydrogensiloxane having at least two hydrosilyl groups per molecule with (ii) an alkenyl-containing alkoxysilane having the general formula (1):

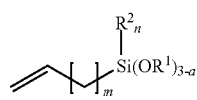

(1)

wherein m is an integer of 4 to 12, n is 0, 1 or 2, $R^1$ and $R^2$ are each independently $C_1$-$C_3$ alkyl or $C_6$-$C_{10}$ aryl, and (B) an organometallic catalyst. These components are described in detail.

(A) Organosiloxane

The organosiloxane (A) is prepared by effecting hydrosilylation reaction of (i) an organohydrogensiloxane having at least two hydrosilyl (Si—H) groups per molecule with (ii) an alkenyl-containing alkoxysilane in the presence of a hydrosilylation catalyst, typically platinum complex catalyst.

In the method of preparing the organosiloxane, the reaction is carried out at a temperature of 15 to 150° C., preferably 40 to 130° C. and more preferably 70 to 120° C. Outside the range, lower temperature may lead to a loss of productivity because the reaction does not take place or takes place at a very low rate. Temperatures above 150° C. may cause pyrolysis or unwanted side reactions.

The reaction time is typically 10 minutes to 24 hours. An appropriate reaction time is selected so that the reactants are fully consumed with the progress of reaction. The reaction time is preferably 1 to 10 hours and more preferably 2 to 7 hours. If the reaction time is too short, the reactants are consumed short. If the reaction time is too long, an extra time is unnecessary because the reactants have been fully consumed, indicating a loss of production efficiency.

If desired, a solvent may be used for the reaction to produce the organosiloxane. The solvent is not particularly limited as long as it is inert to the reactants and does not poison the platinum complex catalyst. Typical solvents include aliphatic hydrocarbon solvents such as hexane and heptane, aromatic hydrocarbon solvents such as toluene and xylene, alcohol solvents such as methanol, ethanol, propanol, and isopropanol, and ketone solvents such as acetone, methyl ethyl ketone, and methyl isobutyl ketone.

One reactant, organohydrogensiloxane (i) is not particularly limited as long as it has at least two S—H groups per molecule. The siloxane bonds may form a linear, branched or cyclic structure. It is preferred from the aspects of low-temperature fast curing ability and the appearance of a coating film that the organohydrogensiloxane be a cyclic siloxane.

Examples of the organohydrogensiloxane include, but are not limited to, tetramethyldisiloxane, tris(dimethylsiloxy) methylsilane, tetrakis(dimethylsiloxy)silane, 1,1,3,3-tetrakis (dimethylsiloxy)-1,3-dimethyldisiloxane, 1,3,5-trimethylcyclotrisiloxane, 1,3,5,7-tetramethylcyclotetrasiloxane, 1,3,5,7-tetramethyl-di-n-propylcyclotetrasiloxane, 1,3,5,7,9-pentamethylcyclopentasiloxane, polymethylsiloxane, and polysiloxanes composed of methylsiloxane units and dimethylsiloxane units. Of these, 1,3,5,7-tetramethylcyclotetrasiloxane is most preferred for the above reason and availability of starting materials.

The alkenyl-containing alkoxysilane (ii) has the general formula (1).

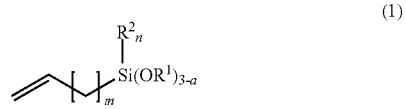

(1)

In formula (1), $R^1$ and $R^2$ are each independently a $C_1$-$C_3$ alkyl group or $C_6$-$C_{10}$ aryl group. The alkyl group may be straight, branched or cyclic, and examples thereof include methyl, ethyl, propyl, and isopropyl. Suitable aryl groups include phenyl and naphthyl. Of these, methyl and ethyl are preferred, with methyl being most preferred, for a balance of availability of starting materials and hydrolysis.

The subscript m is an integer of 4 to 12, preferably 4 to 6, and n is 0, 1 or 2. From the standpoints of hydrolysis of the organosiloxane obtained from hydrosilylation of an organohydrogensiloxane and an alkenyl-containing alkoxysilane in the presence of a platinum complex catalyst and alkali resistance of a cured article obtained by coating a coating composition comprising the organosiloxane and curing the coating, n=0 is preferred and a set of m=6 and n=0 is more preferred.

The reactants are preferably used in such amounts that 0.9 to 1.5 moles, more preferably 1.1 to 1.3 moles of the alkenyl-containing alkoxysilane is available per mole of Si—H group in the organohydrogensiloxane. If the amount of the alkenyl-containing alkoxysilane is less than 0.9 mole, reactant consumption may be insufficient. If the amount of the alkenyl-containing alkoxysilane exceeds 1.5 moles, it may be difficult to remove the unreacted alkenyl-containing alkoxysilane, which has a high boiling point, completely from the reaction product by vacuum distillation, or an extra step of establishing high vacuum conditions is necessary for complete removal, leading to a loss of production efficiency.

The hydrosilylation catalyst used herein is preferably platinum (Pt) and/or a complex compound having platinum (Pt) as center metal as is well known in the art. Suitable catalysts include alcohol solutions of chloroplatinic acid, the complex of chloroplatinic acid with 1,3-divinyltetramethyldisiloxane, neutralized compound of the complex, and a complex of 1,3-divinyltetramethyldisiloxane with a center metal having an oxidation number of 2 or 0 like Pt(II) or Pt(0). Those complexes of a center metal having an oxidation number exclusive of 4, i.e., center metal other than Pt(IV) are preferred for selectivity of addition site, with complexes of Pt(0) and Pt(II) being most preferred.

The amount of the hydrosilylation catalyst used is not particularly limited as long as it can exert catalytic effect to hydrosilylation reaction. Preferably the catalyst is used in an amount of 0.000001 to 1 mole, more preferably 0.0001 to 0.01 mole per mole of the alkenyl-containing alkoxysilane. Less than 0.000001 mole of the catalyst may exert insufficient catalytic effect. More than 1 mole of the catalyst may be uneconomical because the effect is saturated and the production cost is increased.

Examples of the organosiloxane (A) obtained from hydrosilylation reaction of (i) an organohydrogensiloxane with (ii) an alkenyl-containing alkoxysilane in the presence of a hydrosilylation catalyst, typically platinum complex catalyst as illustrated above include, but are not limited to, 1,3-bis(trimethoxysilyloctyl)-1,1,3,3-tetramethyldisiloxane, tris(trimethoxysilyloctyl)dimethylsiloxymethylsilane, tetrakis(trimethoxysilyloctyl)dimethylsiloxysilane, 1,1,3,3-tetrakis(trimethoxysilyloctyl)dimethylsiloxy-1,3-dimethylsiloxane, 1,3,5-tris(trimethoxysilyloctyl)-1,3,5-trimethylcyclotrisiloxane, 1,3,5,7-tetrakis(trimethoxysilylhexyl)-1,3,5,7-tetramethylcyclotetrasiloxane, 1,3,5,7-tetrakis(triethoxysilylhexyl)-1,3,5,7-tetramethylcyclotetrasiloxane, 1,3,5,7-tetrakis(trimethoxysilylheptyl)-1,3,5,7-tetramethylcyclotetrasiloxane, 1,3,5,7-tetrakis(triethoxysilylheptyl)-1,3,5,7-tetramethylcyclotetrasiloxane, 1,3,5,7-tetrakis(trimethoxysilyloctyl)-1,3,5,7-tetramethylcyclotetrasiloxane, 1,3,5,7-tetrakis(triethoxysilyloctyl)-1,3,5,7-tetramethylcyclotetrasiloxane, 1,3,5,7-tetrakis(trimethoxysilylnonyl)-1,3,5,7-tetramethylcyclotetrasiloxane, 1,3,5,7-tetrakis(triethoxysilylnonyl)-1,3,5,7-tetramethylcyclotetrasiloxane, 1,3,5,7-tetrakis(trimethoxysilyldecyl)-1,3,5,7-tetramethylcyclotetrasiloxane, 1,3,5,7-tetrakis(triethoxysilyldecyl)-1,3,5,7-tetramethylcyclotetrasiloxane, 1,3,5,7-tetrakis(trimethoxysilylundecyl)-1,3,5,7-tetramethylcyclotetrasiloxane, 1,3,5,7-tetrakis(triethoxysilylundecyl)-1,3,5,7-tetramethylcyclotetrasiloxane, 1,3,5,7-tetrakis(trimethoxysilyldodecyl)-1,3,5,7-tetramethylcyclotetrasiloxane, 1,3,5,7-tetrakis(triethoxysilyldodecyl)-1,3,5,7-tetramethylcyclotetrasiloxane, 1,3,5,7-tetrakis(trimethoxysilyltridecyl)-1,3,5,7-tetramethylcyclotetrasiloxane, 1,3,5,7-tetrakis(triethoxysilyltridecyl)-1,3,5,7-tetramethylcyclotetrasiloxane, 1,3,5,7-tetrakis(trimethoxysilyltetradecyl)-1,3,5,7-tetramethylcyclotetrasiloxane, 1,3,5,7-tetrakis(triethoxysilyltetradecyl)-1,3,5,7-tetramethylcyclotetrasiloxane, bis(trimethoxysilyloctyl)-1,3,5,7-tetramethyl-di-n-propylcyclotetrasiloxane, and 1,3,5,7,9-pentakis(trimethoxysilyloctyl)-1,3,5,7,9-pentamethylcyclopentasiloxane, Inter alia, 1,3,5,7-tetrakis(trimethoxysilyloctyl)-1,3,5,7-tetramethylcyclotetrasiloxane is most preferred from the standpoints of availability of starting materials, low-temperature fast curing ability, and the appearance of a coating film.

When the organosiloxane (A) contains a cyclic siloxane structure and a long chain spacer as structural units, as represented by the general formula (2), the coating composition exhibits excellent low-temperature, fast curing ability, alkali resistance, and crack resistance.

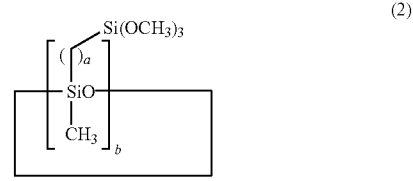

(2)

In formula (2), "a" indicative of the number of carbon atoms in the carbon chain spacer is an integer of 6 to 14. Better low-temperature, fast curing ability is available especially when a is in the range of 6 to 8 and the best low-temperature, fast curing ability is available in case of a=8. Also, "b" is indicative of the number of cyclic siloxane units. As long as b is an integer of 3 to 6, even an organosiloxane having a distribution is acceptable. An organosiloxane wherein b=4 (four siloxane monomers) is preferred because of thermodynamic stability and easy preparation of starting siloxane.

Particularly when the organosiloxane (A) contains a cyclic siloxane structure and a long chain spacer of 8 carbon atoms as its structural units, as represented by the general formula (3), excellent low-temperature, fast curing ability is exerted.

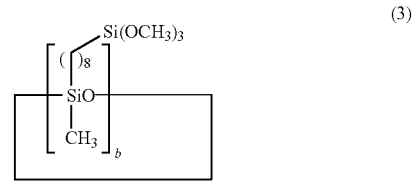

(3)

Herein b is an integer of 3 to 6.

(B) Organometallic Catalyst

The organometallic catalyst (B) in the coating composition is not particularly limited as long as it is selected from curing catalysts used in conventional moisture condensation curing compositions. Suitable organometallic catalysts include titanium, aluminum, tin, zirconium and bismuth-based catalysts. Typical of the titanium-based catalyst are tetraalkyl orthotitanates such as tetrabutyl orthotitanate, tetramethyl orthotitanate, tetraethyl orthotitanate, and tetrapropyl orthotitanate, and partial hydrolyzates thereof. Suitable aluminum-based catalysts include aluminum trihydroxide, aluminum alcoholate, aluminum acylate, aluminum acylate salts, aluminosiloxy compounds, and aluminum metal chelate compounds. Suitable tin-based catalysts include dioctyltin dioctate and dioctyltin dilaurate. The catalyst is not limited to the above examples. Among others, tetraalkyl orthotitanates are preferred because of their reaction promotion, with tetrapropyl orthotitanate and tetrabutyl orthotitanate being most preferred.

The organometallic catalyst is preferably added in an amount of 0.01 to 10 parts by weight, more preferably 0.1 to 5 parts by weight per 100 parts by weight of organosiloxane (A).

While the low-temperature, fast curing coating composition is essentially a mixture of organosiloxane (A) and organometallic catalyst (B), preferably it is substantially solvent-free. As used herein, the term "substantially solvent-free" means a composition containing not more than 1% by weight, especially not more than 0.1% by weight of solvents. The "solvents" refer to those solvents which are incidentally entrained into the low-temperature, fast curing coating composition, for example, the reaction solvent which is used during preparation of organosiloxane (A) and which is not completely removed by vacuum distillation.

The coating composition is applied and cured to the surface of a solid substrate, whereupon a coated solid substrate is provided as a cured article. The solid substrate used herein is not particularly limited. Suitable substrates are polymer substrates including those of polycarbonates, polycarbonate blends, acrylic resins such as poly(methyl methacrylate), polyesters such as poly(ethylene terephthalate) and poly(butylene terephthalate), polyamides, polyimides, acrylonitrile-styrene copolymers, styrene-acrylonitrile-butadiene copolymers, poly(vinyl chloride), polystyrene, blends of polystyrene and polyphenylene ether, butyrate, and polyethylene. Also encompassed in the solid substrate are metal substrates, paint-coated surfaces, glass, ceramics, concrete, slates, and textiles. Best results are obtained when the coating composition is applied to substrates of acrylic resins.

Once the coating composition is applied to a substrate, it will cure at 25° C. and 50% RH within 15 minutes due to its low-temperature, fast curing ability, yielding a cured article. Particularly when the organosiloxane (A) in the composition is a long chain spacer-containing cyclic siloxane represented by the general formula (3), the composition will cure at 25° C. within 2 minutes. A cured article having satisfactory alkali resistance is obtained without defects on the outer surface like cissing (or crawling), cracking, and peeling from the substrate during cure. As used herein, the term "cured" refers to the coating surface being tack-free, that is, with the progress of cure, the coating becomes non-tacky to the finger in contact.

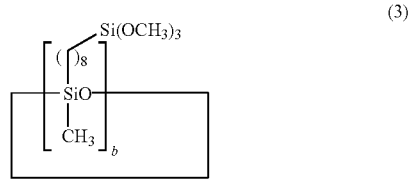

(3)

Herein b is an integer of 3 to 6.

Since the composition cures in a relatively short time after mixing of organosiloxane (A) and organometallic catalyst (B), it is recommended to mix components (A) and (B) immediately before use.

EXAMPLE

Examples and Comparative Examples are given below by way of illustration and not by way of limitation. The materials, amounts, ratios, operations, and operation procedure described in Examples may be changed appropriate for a particular application as long as such changes do not deviate from the scope of the invention.

Example 1

Example 1 used 1,3,5,7-tetramethylcyclotetrasiloxane as the Si—H bond-containing siloxane and 7-octenyltrimethoxysilane as the alkenyl-containing alkoxysilane. Hydrosilylation reaction was carried out in the presence of a platinum complex catalyst, obtaining a corresponding organosiloxane. A coating composition was prepared by uniformly mixing 100 parts by weight of the resulting organosiloxane and 5 parts by weight of tetrabutyl orthotitanate as the organometallic catalyst on a mixer while deaerating. Using a bar coater No. 14, the composition was applied onto an acrylic resin plate in air at 25° C. and 50% RH, after which several tests to be described below were carried out.

Example 2

In Example 2, a composition was prepared by the same mixing ratio and procedure as in Example 1 aside from using aluminum di-n-butoxy(ethyl acetoacetate) as the organometallic catalyst. The composition was applied onto the same substrate (acrylic resin plate), followed by several tests to be described below.

Example 3

Example 3 used 1,3,5,7-tetramethylcyclotetrasiloxane (the same as in Example 1) as the organohydrogensiloxane and 5-hexenyltrimethoxysilane as the alkenyl-containing alkoxysilane. By the same procedure as in Example 1, a corresponding organosiloxane was obtained. A coating composition was prepared using the resulting organosiloxane and tetrabutyl orthotitanate (the same as in Example 1), the same mixing ratio and procedure as in Example 1. The composition was applied onto the same substrate (acrylic resin plate), followed by several tests to be described below.

Example 4

Example 4 used a chain-like siloxane whose average structural formula is composed of three methylsiloxane units, one dimethylsiloxane unit, and two terminal trimethylsiloxane units as the organohydrogensiloxane and 7-octenyltrimethoxysilane (the same as in Example 1) as the alkenyl-containing alkoxysilane. By the same procedure as in Example 1, a corresponding organosiloxane was obtained. A coating composition was prepared using the resulting organosiloxane and tetrabutyl orthotitanate (the same as in Example 1) as the organometallic catalyst, the same mixing ratio and procedure as in Example 1. The composition was applied onto the same substrate (acrylic resin plate), followed by several tests to be described below.

Example 5

Example 5 used tetrakis(dimethylsiloxy)silane as the organohydrogensiloxane and 7-octenyltrimethoxysilane (the same as in Example 1) as the alkenyl-containing alkoxysilane. By the same procedure as in Example 1, a corresponding organosiloxane was obtained. A coating composition was prepared using the resulting organosiloxane and tetrabutyl orthotitanate (the same as in Example 1) as the organometallic catalyst, the same mixing ratio and procedure as in Example 1. The composition was applied onto the same substrate (acrylic resin plate), followed by several tests to be described below.

Example 6

Example 6 used 1,1,3,3-tetrakis(dimethylsiloxy)-1,3-dimethyldisiloxane as the organohydrogensiloxane and 7-octenyltrimethoxysilane (the same as in Example 1) as the alkenyl-containing alkoxysilane. By the same procedure as in Example 1, a corresponding organosiloxane was obtained. A coating composition was prepared using the resulting organosiloxane and tetrabutyl orthotitanate (the same as in Example 1) as the organometallic catalyst, the same mixing ratio and procedure as in Example 1. The composition was applied onto the same substrate (acrylic resin plate), followed by several tests to be described below.

Example 7

Example 7 used 1,3,5,7-tetramethyl-di-n-propylcyclotetrasiloxane as the organohydrogensiloxane and 7-octenyltrimethoxysilane (the same as in Example 1) as the alkenyl-containing alkoxysilane. By the same procedure as in Example 1, a corresponding organosiloxane was obtained. A coating composition was prepared using the resulting organosiloxane and tetrabutyl orthotitanate (the same as in Example 1) as the organometallic catalyst, the same mixing ratio and procedure as in Example 1. The composition was applied onto the same substrate (acrylic resin plate), followed by several tests to be described below.

Comparative Example 1

A composition was prepared by using 100 parts by weight of 7-octenyltrimethoxysilane and 5 parts by weight of tetrabutyl orthotitanate (the same as in Example 1) as the organometallic catalyst and following the same procedure as in Example 1. The composition was applied onto the same substrate (acrylic resin plate), followed by several tests to be described below.

Comparative Example 2

A composition was prepared by using 100 parts by weight of N-2-(aminoethyl)-3-aminopropyltrimethoxysilane and 5 parts by weight of tetrabutyl orthotitanate (the same as in Example 1) as the organometallic catalyst and following the same procedure as in Example 1. The composition was applied onto the same substrate (acrylic resin paste), followed by several tests to be described below.

Comparative Example 3

A composition was prepared by using 100 parts by weight of tetramethoxysilane and 5 parts by weight of tetrabutyl orthotitanate (the same as in Example 1) as the organometallic catalyst and following the same procedure as in Example 1. The composition was applied onto the same substrate (acrylic resin plate), followed by several tests to be described below.

Comparative Example 4

A composition was prepared by using 100 parts by weight of trimethoxymethylsilane and 5 parts by weight of tetrabutyl orthotitanate (the same as in Example 1) as the organometallic catalyst and following the same procedure as in Example 1. The composition was applied onto the same substrate (acrylic resin plate), followed by several tests to be described below.

Comparative Example 5

A composition was prepared by using 100 parts by weight of an oligomer obtained from partial hydrolysis of trimethoxymethylsilane and 5 parts by weight of tetrabutyl orthotitanate (the same as in Example 1) as the organometallic catalyst and following the same procedure as in Example 1. The composition was applied onto the same substrate (acrylic resin plate), followed by several tests to be described below.

Comparative Example 6

Comparative Example 6 used 1,3,5,7-tetramethylcyclotetrasiloxane (the same as in Example 1) as the organohydrogensiloxane and vinyltrimethoxysilane as the alkenyl-containing alkoxysilane. By the same procedure as in Example 1, a corresponding organosiloxane was obtained. A coating composition was prepared using the resulting organosiloxane and tetrabutyl orthotitanate (the same as in Example 1) as the organometallic catalyst, the same mixing ratio and procedure as in Example 1. The composition was applied onto the same substrate (acrylic resin plate), followed by several tests to be described below.

Low-Temperature, Fast Curing Test

After each of the compositions of Examples 1 to 7 and Comparative Examples 1 to 6 was applied to the substrate (acrylic resin plate) by the above coating method, a tack-free time (i.e., time passed until the coating became non-tacky to the contact finger with the progress of cure) was determined. The test results are shown in Table 1.

Alkali Resistance

After each of the compositions of Examples 1 to 7 and Comparative Examples 1 to 6 was applied to the substrate (acrylic resin plate) by the above coating method and cured, the cured film was examined for alkali resistance by a spot test using a sodium hydroxide aqueous solution. Specifically, the coating as applied was allowed to stand for one week until it fully cured. Droplets of 10 wt % sodium hydroxide aqueous solution were individually dropped onto the cured film at five spots in total. In this state, the film was allowed to stand at room temperature (25° C.) for one hour. The film was washed with water and dried, after which it was visually observed for any dissolution and water marks. Those samples where no water marks were observed were rated "◯" as satisfactory alkali resistance. Those samples where water marks were observed or the film was dissolved away were rated "X". The test results are shown in Table 1.

Appearance

After each of the compositions of Examples 1 to 7 and Comparative Examples 1 to 6 was applied to the substrate (acrylic resin plate) by the above coating method and cured, the cured film was examined for appearance. Specifically, appearance defects were inspected such as cracking and peeling from the substrate during the cure course ("Crack" in Table 1) and a phenomenon that the coating liquid is repelled to form recesses ("Cissing" in Table 1). Those samples where no appearance defects were observed were rated "◯" as excellent appearance. Those samples where a few appearance defects were observed were rated "Δ".

Those samples where many appearance defects were observed were rated "X". The test results are shown in Table 1.

TABLE 1

| | Example | | | | | | |
|---|---|---|---|---|---|---|---|
| | 1 | 2 | 3 | 4 | 5 | 6 | 7 |
| Tack-free time (min) | 2 | 5 | 10 | 15 | 12 | 11 | 10 |
| Alkali resistance | ○ | ○ | ○ | ○ | ○ | ○ | ○ |
| Crack | ○ | ○ | ○ | ○ | Δ | Δ | Δ |
| Cissing | ○ | ○ | ○ | Δ | Δ | Δ | Δ |

| | Comparative Example | | | | | |
|---|---|---|---|---|---|---|
| | 1 | 2 | 3 | 4 | 5 | 6 |
| Tack-free time (min) | >60 | 30 | 2 | 1 | 30 | 20 |
| Alkali resistance | ○ | X | X | X | X | X |
| Crack | ○ | ○ | X | ○ | ○ | X |
| Cissing | ○ | ○ | ○ | ○ | ○ | ○ |

A low-temperature, fast curing ability is attested by the test results. It was demonstrated that when the compositions of Examples 1 to 7 were applied to substrates, they cured at 25° C. within 15 minutes. Particularly when the composition contains a cyclic siloxane having a long chain spacer represented by formula (2) as the organosiloxane as in Example 1, cure takes place at 25° C. within 2 minutes, and a cured article having satisfactory alkali resistance is obtained without inviting appearance defects such as cracking and peeling from the substrate during the cure course and cissing. As used herein, the term "cure" means that a coating film becomes tack-free, that is, a coating film becomes non-tacky to the contact finger with the progress of cure.

Although a particular embodiment of the invention has been described in detail for purposes of illustration, various modifications and enhancements may be made without departing from the spirit and scope of the invention. Accordingly, the invention is not to be limited except as by the appended claims.

Japanese Patent Application No. 2013-093760 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A low-temperature, fast curing coating composition comprising:
(A) an organosiloxane containing a random mixture of isomers having the general formula (2):

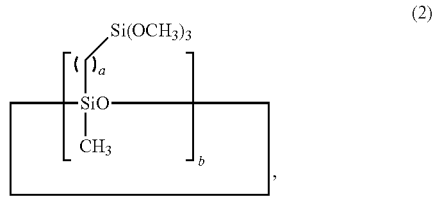

wherein a is an integer of 6 to 8 and b is an integer of 3 to 6, and (B) an organometallic catalyst selected from the group consisting of tetraalkyl orthotitanates and partial hydrolyzates thereof, aluminum trihydroxide, aluminum alcoholate, aluminum acylate, aluminum acylate salts, aluminosiloxy compounds, aluminum metal chelate compounds, dioctyltin dioctate, and dioctyltin dilaurate, said coating composition being substantially solvent-free.

2. The coating composition of claim 1 wherein the organosiloxane (A) containing a random mixture of isomers has the general formula (3):

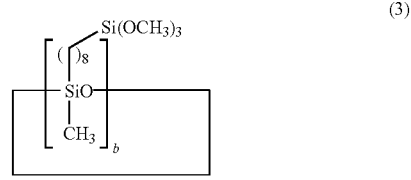

wherein b is an integer of 3 to 6.

3. The coating composition of claim 1 wherein the organometallic catalyst (B) comprises titanium.

4. The coating composition of claim 1 wherein the organosiloxane (A) is mixed with the organometallic catalyst (B) immediately before use.

5. A cured article of a coating composition according to claim 1.

6. An article comprising a polymer substrate having a cured product of the coating composition of claim 1 on the surface of the polymer substrate.

7. The coating composition of claim 1 comprising:
(A) an organosiloxane component consisting of organosiloxane containing a random mixture of isomers having the general formula (2):

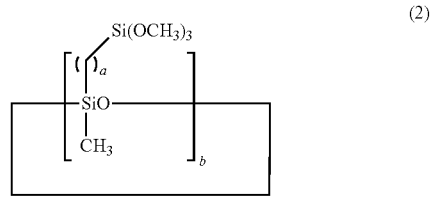

wherein a is an integer of 6 to 8 and b is an integer of 3 to 6, and
(B) an organometallic catalyst selected from the group consisting of tetraalkyl orthotitanates and partial hydrolyzates thereof, aluminum trihydroxide, aluminum alcoholate, aluminum acylate, aluminum acylate salts, aluminosiloxy compounds, aluminum metal chelate compounds, dioctyltin dioctate, and dioctyltin dilaurate.

8. The coating composition of claim 1 wherein the organometallic catalyst is a tetraalkyl orthotitanate.

9. An article having a cured product of a low-temperature, fast curing coating composition on the surface of an acrylic resin, the coating composition comprising:
(A) an organosiloxane having the general formula (2):

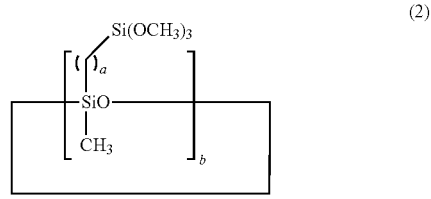

wherein a is an integer of 6 to 8 and b is an integer of 3 to 6, and (B) an organometallic catalyst.

10. The coating composition of claim 9, wherein the organometallic catalyst is selected from the group consisting of tetraalkyl orthotitanates and partial hydrolyzates thereof, aluminum trihydroxide, aluminum alcoholate, aluminum acylate, aluminum acylate salts, aluminosiloxy compounds, aluminum metal chelate compounds, dioctyltin dioctate, and dioctyltin dilaurate.

11. The coating composition of claim 9, wherein the organometallic catalyst is a tetraalkyl orthotitanate.

12. A coating composition consisting of:

(A) an organosiloxane with a random mixture of isomers having the general formula (2):

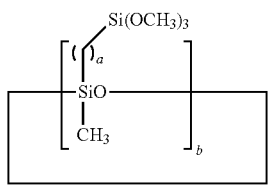
(2)

wherein a is an integer of 6 to 8 and b is an integer of 3 to 6, and (B) an organometallic catalyst selected from the group consisting of tetraalkyl orthotitanates and partial hydrolyzates thereof, aluminum trihydroxide, aluminum alcoholate, aluminum acylate, aluminum acylate salts, aluminosiloxy compounds, aluminum metal chelate compounds, dioctyltin dioctate, and dioctyltin dilaurate, wherein the organometallic catalyst is included in an amount of 0.01 to 10 parts by weight of the organosiloxane.

13. A method of curing a low-temperature, fast curing coating composition, the method comprising:

curing the coating composition of claim 1.

14. The method of claim 13, wherein the curing temperature is 25° C.

15. The method of claim 13, wherein the curing occurs within 15 minutes.

16. The method of claim 13, wherein the curing occurs within 2 minutes.

17. The method of claim 13, wherein the organometallic catalyst is a tetraalkyl orthotitanate.

* * * * *